US008665139B2

(12) United States Patent
Matsumoto et al.

(10) Patent No.: US 8,665,139 B2
(45) Date of Patent: Mar. 4, 2014

(54) DISTANCE MEASURING APPARATUS AND DISTANCE MEASURING METHOD

(71) Applicant: Nireco Corporation, Tokyo (JP)

(72) Inventors: Koichi Matsumoto, Tokyo (JP); Yasumasa Kato, Tokyo (JP)

(73) Assignee: Nireco Corporation, Tokyo (JP)

(*) Notice: Subject to any disclaimer, the term of this patent is extended or adjusted under 35 U.S.C. 154(b) by 0 days.

(21) Appl. No.: 13/722,065

(22) Filed: Dec. 20, 2012

(65) Prior Publication Data

US 2013/0181862 A1 Jul. 18, 2013

Related U.S. Application Data

(63) Continuation of application No. PCT/JP2010/004513, filed on Jul. 12, 2010.

(51) Int. Cl.
*G01S 13/08* (2006.01)
*G01S 13/00* (2006.01)

(52) U.S. Cl.
USPC ........... 342/127; 342/118; 342/128; 342/129; 342/130; 342/175; 342/194

(58) Field of Classification Search
USPC ............. 342/70–72, 118, 127–132, 134, 135, 342/175, 194
See application file for complete search history.

(56) References Cited

U.S. PATENT DOCUMENTS

| | | | | |
|---|---|---|---|---|
| 4,933,916 A | * | 6/1990 | May et al. ...................... 367/125 |
| 5,075,863 A | * | 12/1991 | Nagamune et al. ............ 702/159 |
| RE35,607 E | * | 9/1997 | Nagamune et al. ........... 702/158 |
| 5,719,579 A | * | 2/1998 | Torre et al. ........................ 342/13 |
| 5,793,327 A | * | 8/1998 | Carnes et al. .................. 342/135 |
| 6,693,582 B2 | * | 2/2004 | Steinlechner et al. .......... 342/70 |
| 6,714,286 B1 | * | 3/2004 | Wheel .......................... 356/5.05 |
| 6,822,605 B2 | * | 11/2004 | Brosche ........................ 342/130 |
| 7,023,377 B2 | * | 4/2006 | Axelsson ...................... 342/109 |

(Continued)

FOREIGN PATENT DOCUMENTS

| | | |
|---|---|---|
| EP | 2187235 A1 | 5/2010 |
| JP | 49-21839 A | 6/1974 |

(Continued)

OTHER PUBLICATIONS

International Search Report and Written Opinion dated Aug. 17, 2010 corresponding to International Patent Application No. PCT/JP2010/004513.

*Primary Examiner* — Jack W Keith
*Assistant Examiner* — Peter Bythrow
(74) *Attorney, Agent, or Firm* — Squire Sanders (US) LLP (57) ABSTRACT

Disclosed is a distance measuring apparatus which includes: a first pulse generating means (135) which generates reference signals; a second pulse generating means (137) which generates subject detection signals; a time measuring section (139) which measures a period of time from a time when a first pulse is generated to a time when a second pulse is generated; a first phase detecting section (141) which detects the first phase of a signal received using a signal at a first frequency; a second phase detecting section (163) which detects the second phase of a signal received using a signal at a second frequency; and a distance calculating section (165) which calculates the distance to the subject on the basis of output from the time measuring section, the first phase detecting section and the second phase detecting section.

7 Claims, 4 Drawing Sheets

(56) References Cited

U.S. PATENT DOCUMENTS

| | | | |
|---|---|---|---|
| 7,460,055 B2 * | 12/2008 | Nishijima et al. | 342/70 |
| 7,564,400 B2 * | 7/2009 | Fukuda | 342/145 |
| 7,609,199 B2 * | 10/2009 | Nishijima et al. | 342/175 |
| 7,642,952 B2 * | 1/2010 | Fukuda | 342/175 |
| 7,864,105 B2 * | 1/2011 | Matsumoto | 342/127 |
| 2005/0156780 A1 * | 7/2005 | Bonthron et al. | 342/107 |
| 2005/0225481 A1 * | 10/2005 | Bonthron | 342/175 |
| 2006/0012513 A1 * | 1/2006 | Walton | 342/195 |
| 2009/0074031 A1 * | 3/2009 | Fukuda | 375/130 |
| 2009/0091491 A1 * | 4/2009 | Ujita et al. | 342/194 |
| 2010/0245156 A1 * | 9/2010 | Matsumoto | 342/127 |

FOREIGN PATENT DOCUMENTS

| | | |
|---|---|---|
| JP | 52-127794 A | 10/1977 |
| JP | 61-145473 A | 7/1986 |
| WO | WO 2009/050831 A1 | 4/2009 |

\* cited by examiner

DISTANCE MEASURING APPARATUS AND DISTANCE MEASURING METHOD

CROSS REFERENCE TO RELATED APPLICATIONS

This application is a continuation of International Patent Application No. PCT/JP2010/004513 filed Jul. 12, 2010. The contents of this application is hereby incorporated by reference.

TECHNICAL FIELD

The present invention relates to a distance measuring apparatus and a distance measuring method for measuring a distance to a target.

BACKGROUND ART

WO2009/050831A1 discloses a distance measuring apparatus in which for measuring a distance to a target, electromagnetic wave (for example, micro wave) signal is transmitted to the target, the signal reflected by the target is received, a time period during which the signal travels to the target and then back to the apparatus is measured, a change in phase (a phase difference) of the signal is detected, a rough distance measurement is carried out based on the time period, a precise distance measurement is carried out based on the phase difference, and the rough distance measurement and the precise distance measurement are combined to obtain a final measurement value of distance. According to the distance measuring apparatus described above, distance measurement can be carried out with a relatively high accuracy for a wide range, because the rough distance measurement using time and the precise distance measurement using phase difference are combined.

However, in the apparatus described above, accuracy of the precise distance measurement using phase difference is restricted by accuracy of the rough distance measurement using time.

Accordingly, there is a need for a distance measuring apparatus and a distance measuring method which are not restricted by accuracy of the rough distance measurement using time.

SUMMARY OF THE INVENTION

The distance measuring apparatus according to the present invention includes: a first pseudo random signal generator for generating a first pseudo random signal of clock frequency of $f_1$; a second pseudo random signal generator for generating a second pseudo random signal which has the same pattern as that of the first pseudo random signal and clock frequency of $f_2$ slightly lower than $f_1$; a first multiplier for multiplying the first pseudo random signal by the second pseudo random signal; a first carrier wave generator for generating a carrier wave of a first frequency; a first modulator for modulating the carrier wave of the first frequency by the first pseudo random signal; a first transmitter for transmitting the modulated carrier wave of the first frequency to a target as a modulated signal for transmission of the first frequency; a first receiver for receiving the modulated signal for transmission of the first frequency reflected by the target as a received signal of the first frequency; a second multiplier for multiplying the received signal of the first frequency by the second pseudo random signal to obtain a modulated received signal of the first frequency; a first hybrid coupler for receiving a part of the carrier wave of the first frequency and delivering a first I signal and a first Q signal which are two components phases of which are orthogonal to each other; a third multiplier for multiplying an output signal of the second multiplier by the first I signal; a fourth multiplier for multiplying the output signal of the second multiplier by the first Q signal; a first low-pass filter for low-pass filtering of an output of the first multiplier; a second low-pass filter for low-pass filtering of an output of the third multiplier; a third low-pass filter for low-pass filtering of an output of the fourth multiplier; first and second units for obtaining a square of the output signal of the second low-pass filter and a square of the output signal of the third low-pass filter, respectively; an adder for adding outputs of the first and second units; a first pulse generator for generating a first pulse when a maximum amplitude value of an output signal of the first low-pass filter is detected; a second pulse generator for generating a second pulse when a maximum amplitude value of an output signal of the adder is detected; and a time measuring section for measuring a time period between generation of the first pulse and generation of the second pulse.

The distance measuring apparatus according to the present invention further includes: a first phase detector for detecting a phase of the modulated received signal of the first frequency based on outputs of the second and third low-pass filters; a second carrier wave generator for generating a second carrier wave of a second frequency which is lower than the first frequency; a second modulator for modulating the second carrier wave by the first pseudo random signal; a second transmitter for transmitting the modulated second carrier wave to the target as a modulated signal for transmission of the second frequency; a second receiver for receiving the modulated signal for transmission of the second frequency reflected by the target as a received signal of the second frequency; a fifth multiplier for multiplying the received signal of the second frequency by the second pseudo random signal to obtain a modulated received signal of the second frequency; a second hybrid coupler for receiving a part of the carrier wave of the second frequency and delivering a second I signal and a second Q signal which are two components phases of which are orthogonal to each other; a sixth multiplier for multiplying an output signal of the fifth multiplier by the second I signal; a seventh multiplier for multiplying the output signal of the fifth multiplier by the second Q signal; a fourth low-pass filter for low-pass filtering of an output of the sixth multiplier; a fifth low-pass filter for low-pass filtering of an output of the seventh multiplier; a second phase detector for detecting a phase of the modulated received signal of the second frequency based on outputs of the fourth and fifth low-pass filters; and a distance computing unit for computing a distance to the target based on outputs of the time measuring section, the first phase detector and the second phase detector.

The distance measuring apparatus according to the present invention includes, besides the first phase detector for detecting a phase of the modulated received signal of the first frequency, the second phase detector for detecting a phase of the modulated received signal of the second frequency which is lower than the first frequency, and therefore phase detection using electromagnetic waves of two or more frequencies can be carried out. Accordingly, by the distance measuring apparatus according to the present invention, a high accuracy distance measurement can be carried out without restriction caused by accuracy of the rough distance measurement.

The distance measuring method according to the present invention includes the steps of generating a first pseudo random signal of clock frequency of $f_1$ and a second pseudo random signal which has the same pattern as that of the first pseudo random signal and clock frequency of $f_2$ which is slightly lower than $f_1$; transmitting, to a target, a modulated signal for transmission of a first frequency obtained by modulating a carrier wave of the first frequency by the first pseudo random signal and a modulated signal for transmission of a second frequency obtained by modulating a carrier wave of the second frequency by the first pseudo random signal, the second frequency being lower than the first frequency; receiving the modulated signal for transmission of the first frequency and the modulated signal for transmission of the second frequency reflected by the target as a received signal of the first frequency and a received signal of the second frequency; multiplying the received signal of the first frequency and the received signal of the second frequency by the second pseudo random signal to obtain a modulated received signal of the first frequency and a modulated received signal of the second frequency, respectively; multiplying the modulated received signals of the first and second frequencies by I signals and Q signals of the carrier waves of the first and second frequencies to obtain I components and Q components of the modulated received signals of the first and second frequencies, I signal and Q signal being two components phases of which are orthogonal to each other; obtaining a signal of a sum of squares of the I component and Q component of the modulated received signals of the first frequency; and obtaining a value of rough distance measurement to the target based on a time period between a time when a peak value of a product of the first pseudo random signal and the second pseudo random signal is detected and a time when a peak value of the signal of the sum of squares is detected. The distance measuring method according to the present invention further includes the steps of obtaining a first and a second measurement values of the first and second modulated received signals based on the I components and Q components of the modulated received signals of the first and second frequencies; obtaining a second group of plural candidate values of precise distance based on a reference distance, a second measurement value of reference phase of the modulated signal of the second frequency for the reference distance, which is previously obtained, and a second measurement value of phase and selecting the candidate value of precise distance which is the closest to the value of rough distance measurement in the plural candidate values of the second group as a value of the second group; and obtaining a first group of plural candidate values of precise distance based on the reference distance, a first measurement value of reference phase of the modulated signal of the first frequency for the reference distance, which is previously obtained, and a first measurement value of phase and selecting the candidate value of precise distance which is the closest to the value of the second group in the plural candidate values of the first group as a measurement value of distance. Further, in signals of plural frequencies used for precise distance measurement based on phase, one fourth of the longest wavelength corresponding to the lowest frequency is so determined as to be greater than an accuracy of rough distance measurement and one fourth of a wavelength corresponding to the higher frequency in two adjacent frequencies is so determined as to be greater than an accuracy of precise distance measurement based on phase using the lower frequency in the two adjacent frequencies.

As described above, in the distance measuring method according to the present invention, signals of plural frequencies are used for precise distance measurement. In the signals of the plural frequencies, one fourth of the longest wavelength corresponding to the lowest frequency is so determined as to be greater than an accuracy of rough distance measurement and one fourth of a wavelength corresponding to the higher frequency in two adjacent frequencies is so determined as to be greater than an accuracy of precise distance measurement based on phase using the lower frequency in the two adjacent frequencies.

Accordingly, by the distance measuring method according to the present invention, distance measurement with a higher accuracy can be realized without restriction caused by accuracy of the rough distance measurement.

In a distance measuring method according to an embodiment of the present invention, a value of distance measurement is determined based on candidate values of precise distance of three or more groups including the first and second groups using three or more transmission signals of different frequencies including the modulated signal for transmission of the first and second frequencies.

In the distance measuring method according to the present embodiment, signals of three or more frequencies are used for precise distance measurement based on phase. In the signals of the three or more frequencies, one fourth of the longest wavelength corresponding to the lowest frequency is so determined as to be greater than an accuracy of rough distance measurement and one fourth of a wavelength corresponding to the higher frequency in two adjacent frequencies is so determined as to be greater than an accuracy of precise distance measurement based on phase using the lower frequency in the two adjacent frequencies.

Accordingly, according to the distance measuring method according to the present embodiment, by the use of three or more frequencies, distance measurement with an accuracy which is higher than that obtained with two kinds of frequencies can be realized.

MODE FOR CARRYING OUT THE INVENTION

In a distance measuring apparatus according to the present invention, electromagnetic wave (for example, micro wave) signal is transmitted to the target, the signal reflected by the target is received, a time period during which the signal travels to the target and then back to the apparatus, a change in phase (a phase difference) of the signal is detected, a rough distance measurement is carried out based on the time period, a precise distance measurement is carried out based on the phase difference, and the rough distance measurement and the precise distance measurement are combined to obtain a final measurement value of distance.

First, the principle of distance measurement based on time period will be described.

The repetition frequency of a first pseudo random signal is $f_1$, the repetition frequency of a second pseudo random signal is $f_2$, and the repeated patterns of the pseudo random signals are identical with each other. Assume that $f_1 > f_2$.

Assuming that a period in which the reference signal obtained by correlating the first pseudo random signal for transmission and the second pseudo random signal reaches a maximum value is $T_B$, a difference between the wave number of the first pseudo random signal and that of the second pseudo random signal included in $T_B$ indicates a wave number N in one period of the repeated patterns of the first and second pseudo random signals.

That is;

$$T_B \cdot f_1 = T_B \cdot f_2 + N$$

From the equation described above, $T_B$ is given by Equation (1) described below.

$$T_B = N/(f_1 - f_2) \qquad (1)$$

As the difference between the two clock frequencies decreases, the period $T_B$ in which the reference signal reaches a maximum value increases.

More specifically, assume that the first and second pseudo random signals are M-sequence signals of seven bits which have the same repeated pattern. The wave number of a period of the repeated patterns of the first and second pseudo random signals is $2^7 - 1 = 127$. Assuming that $f_1 = 100.004$ MHz and $f_2 = 99.996$ MHz, then TB=15.875 ms.

Figure 1A:
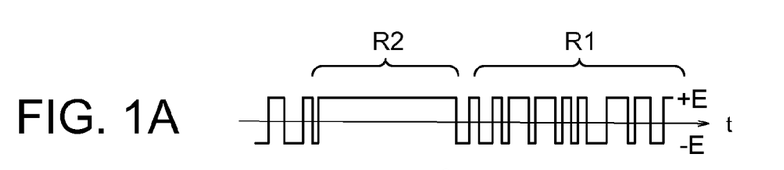
FIGS. 1A and 1B illustrate the reference signal obtained by correlating the first pseudo random signal and the second pseudo random signal.
Figure 1B:
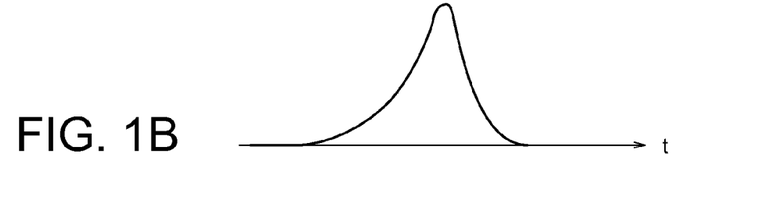

FIGS. 1A and 1B illustrate the reference signal obtained by correlating the first pseudo random signal and the second pseudo random signal. FIG. 1A shows the signal obtained by correlating the first pseudo random signal and the second pseudo random signal. The horizontal axis of FIG. 1A represents time while the vertical axis represents magnitude of the signal. More specifically, +E on the vertical axis indicates that correlation between the both signals is 1, that is, the both signals are identical with each other while −E on the vertical axis indicates that correlation between the both signals is 0, that is, the both signals are different from each other. In the time period marked by R1 in FIG. 1A, phases of the both signals are not in agreement with each other, and therefore the correlation between the both signals becomes 0 or 1 at random. In the time period marked by R2 in FIG. 1A, phases of the both signals are in agreement with each other, and therefore the correlation between the both signals are maintained at 1 for a certain time period. FIG. 1B shows the signal obtained by having the signal shown in FIG. 1A pass through a low-pass filter. This signal is the reference signal. In the time period of FIG. 1B corresponding to the time period marked with R1 in FIG. 1A, the reference signal is 0 while in the time period of FIG. 2B corresponding to the time period marked with R2 in FIG. 1A, the reference signal shows the maximum value.

The propagation time in which the carrier wave phase modulated by the first pseudo random signal is transmitted, reflected on the target, and then received is represented as $\tau$. The time difference between the time when the pulse signal of the reference signal is generated and the time when the pulse signal of a signal representing a detected object is generated by demodulating the received signal by the second pseudo random signal for coherent detection, is represented as $T_D$. Then, since the wave number of the second pseudo random signal generated in $T_D$ is smaller than the wave number of the first pseudo random signal generated in $T_D$ by the wave number of the first pseudo random signal generated in time $\tau$, the following equation is established.

$$T_D \cdot f_2 = T_D \cdot f_1 - \tau \cdot f_1$$

From the equation described above, $T_D$ is given by Equation (2) described below.

$$T_D = \tau \cdot f_1 / (f_1 - f_2) \qquad (2)$$

That is, the propagation time $\tau$ is measured as $T_D$ which is enlarged in time or is reduced in speed by the factor of $f_1/(f_1 - f_2)$. Because of enlarged measured time, the present invention can provide a distance measuring apparatus essentially suitable for short-distance measurement.

More specifically, since $f_1 = 100.004$ MHz and $f_2 = 99.996$ MHz, the propagation time $\tau$ is magnified 12,500 times as shown by the following equation.

$$T_D = 12500 \cdot \tau \qquad (3)$$

Time $T_D$ is obtained for each period of $T_B$ of the above-described reference signal.

Figure 2:
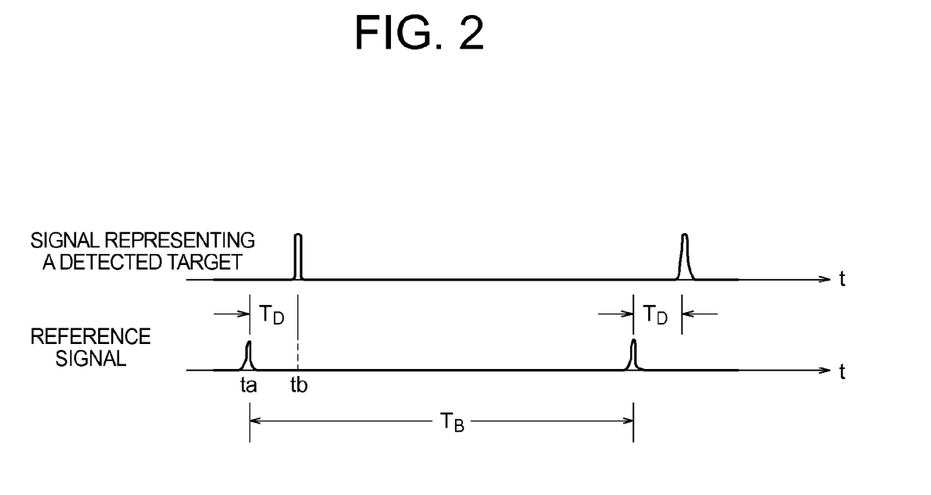
FIG. 2 shows a relationship between a signal representing a detected target and the reference signal.

FIG. 2 shows a relationship between a signal representing a detected target and the reference signal. The reference signal is generated for each period of $T_B$. The signal representing a detected target is generated with a delay of $T_D$ which is determined by the propagation time $\tau$ of the signal with respect to the reference signal.

Assuming that the propagation speed is v and the distance to the target is x, the propagation time $\tau$ is given by $\tau = 2x/v$. Accordingly, the following equation is obtained by substituting the above-described equation into Equation (2).

$$x = (f_1 - f_2) \cdot v \cdot T_D / (2 f_1) \qquad (4)$$

Thus, distance x can be calculated by substituting time difference $T_D$ into Equation (4).

The principle of distance measurement based on phase will be described below.

Assuming that a distance between the distance measuring apparatus and the target is x, a phase difference between the transmitted signal and the received signal is $\theta$ and a wavelength of electromagnetic wave as carrier wave is $\lambda$, the following equation holds.

$$\frac{\theta}{2x} = \frac{2\pi}{\lambda}$$

By transforming the above-described equation, the following equation is obtained.

$$x = \frac{\lambda}{4\pi} \cdot \theta$$

Thus, the distance x between the distance measuring apparatus and the target can be obtained by obtaining the phase difference.

Assuming that a phase difference in the range of $(-\pi, \pi)$ is represented by $\theta'$ and a positive integer is represented by n, the following equation is obtained.

$$x = \frac{\lambda}{4\pi}(\theta' \pm 2\pi n) = \frac{\lambda}{4\pi}\theta' \pm \frac{\lambda}{2} \cdot n \qquad (5)$$

When phase is measured by a usual method, a phase difference $\theta'$ in the range of $(-\pi, \pi)$ is measured. Even if a phase difference $\theta'$ in the range of $(-\pi, \pi)$ is measured, an absolutte value of distance cannot be obtained from Equation (5). Accordingly, in general, a reference position for a target is determined, a distance and a phase for the reference position are determined and a distance from the reference position is obtained by measuring a phase difference with respect to the reference position in the range of (−π, π). For example, the above-described distance measurement based on time period is carried out to obtain a distance for the reference position.

The distance measurement based on time period and that based on phase described above are publicly known. The features of the present invention will be described in detail later.

The configuration of a distance measuring apparatus according to an embodiment of the present invention will be described below.

Figure 3:
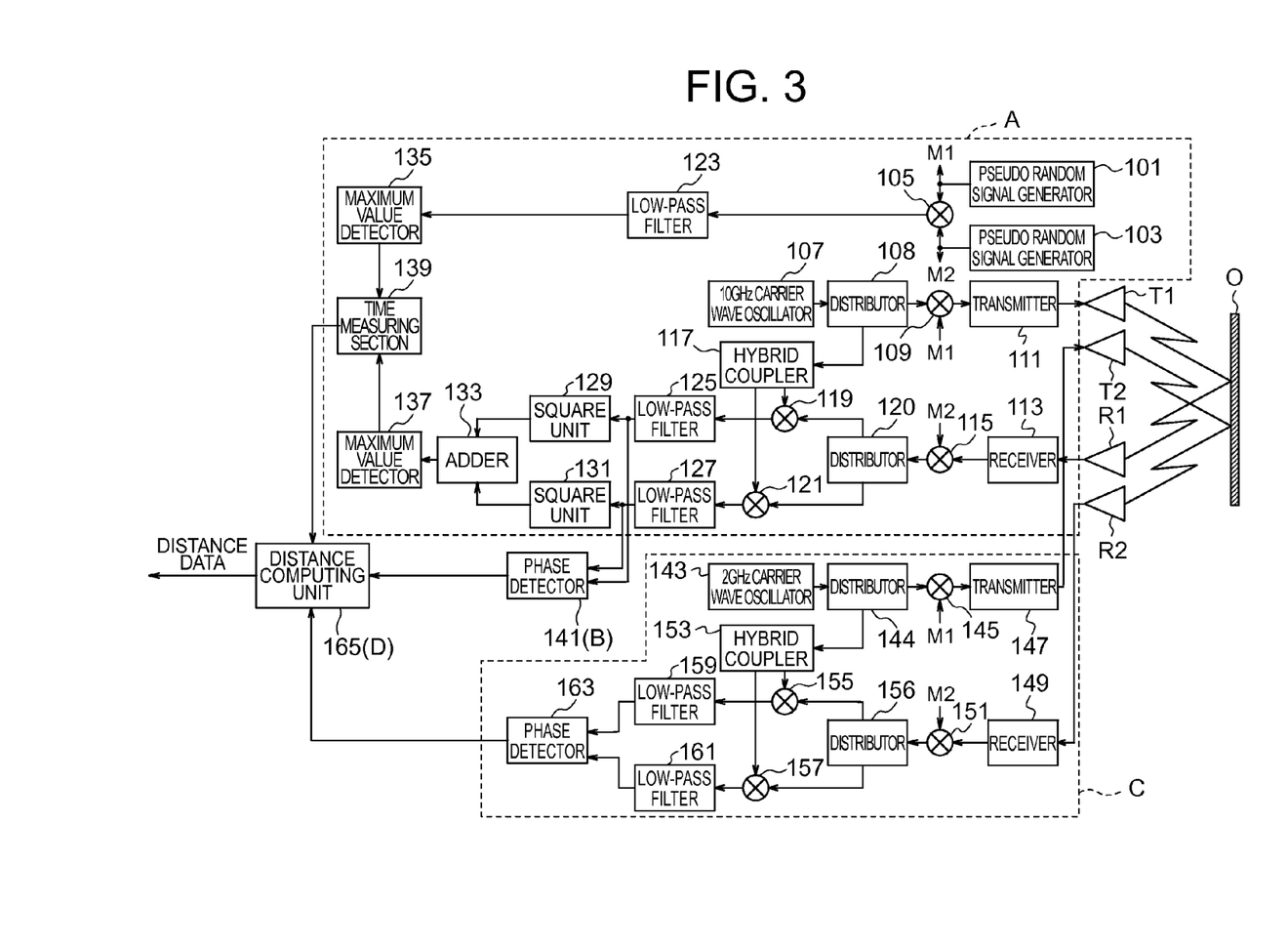
FIG. 3 shows the configuration of the distance measuring apparatus according to an embodiment of the present invention.

FIG. 3 shows the configuration of the distance measuring apparatus according to an embodiment of the present invention. The distance measuring apparatus according to the embodiment of the present invention includes four sections, section A, section B, section C and section D. The section A obtains a time difference $T_D$ between the time when the signal representing a detected target is generated and the time when the reference signal is generated. The section B detects a phase using carrier wave of the first frequency. The section C detects a phase using carrier wave of the second frequency which is lower than the first frequency. The section D obtains a measurement value of distance by combining outputs of the section A, the section B and the section C.

The section A includes a section for generating the reference signal, a section for generating modulated signal for transmission of the first frequency, a section for obtaining modulated received signal of the first frequency, a section for obtaining the signal representing a detected target, and a section for obtaining a time difference $T_D$ between the time when the signal representing a detected target is generated and the time when the reference signal is generated. In the present embodiment, the first frequency is 10 GHz. The section for obtaining a time difference $T_D$ is represented as a time measuring section 139 in FIG. 3.

The section for generating the reference signal includes a first pseudo random signal generator 101 for generating first pseudo random signal of clock frequency of $f_1$, a second pseudo random signal generator 103 or generating second pseudo random signal of clock frequency of $f_2$, a first multiplier 105 for multiplying the first pseudo random signal by the second pseudo random signal, a first low-pass filter 123 for low-pass filtering of the output signal of the first multiplier and a first pulse generator (a maximum value detector) 135 for generating a first pulse when the maximum amplitude value of the output signal of the first low-pass filter 123 is detected. The second pseudo random signal has the same pattern as that of the first pseudo random signal and the clock frequency of f1 is slightly less than the clock frequency of f2. The above-described first pulse is the reference signal (FIG. 2).

The section for generating modulated signal for transmission of the first frequency includes a first carrier wave generator 107 for generating carrier wave of the first frequency (10 GHz), a distributor 108 for distributing the output of the first carrier wave generator 107, a first modulator 109 for modulating the carrier wave of the first frequency by the first pseudo random signal and a first transmitter 111 for transmitting the modulated carrier wave of the first frequency to the target O as modulated signal for transmission of the first frequency. The first transmitter is provided with a first transmitting antenna T1.

The section for obtaining modulated received signal of the first frequency includes a first receiver 113 for receiving the modulated signal of the first frequency which has been reflected by the target O as received signal of the first frequency, a second multiplier 115 for multiplying the received signal of the first frequency by the second pseudo random signal to obtain the modulated received signal of the first frequency and a distributor 120 for distributing the output of the second multiplier 115. The first receiver 113 is provided with a first receiving antenna R1.

The section for obtaining the signal representing a detected target includes a first hybrid coupler 117 for receiving a part of the carrier wave of the first frequency and delivering a first I signal and a first Q signal which are two components phases of which are orthogonal to each other, a third multiplier 119 for multiplying the output signal of the second multiplier 115 by the first I signal, a fourth multiplier 121 for multiplying the output signal of the second multiplier 115 by the first Q signal, a second low-pass filter 125 for low-pass filtering of the output signal of the third multiplier 119, a third low-pass filter 127 for low-pass filtering of the output signal of the fourth multiplier 121, a first unit 129 for obtaining a square of the output signal of the second low-pass filter 125, a second unit 131 for obtaining a square of the output signal of the third low-pass filter 127, an adder 133 for adding the output signals of the first and the second units and a second pulse generator (a maximum value detector) 137 for generating a second pulse when the maximum amplitude value of the output signal of the adder 133. The above-described second pulse is the signal representing a detected target (FIG. 2).

The section B which detects a phase of the modulated received signal of the first frequency is a first phase detector 141. The first phase detector 141 monitors the output signal of the second low-pass filter 125 and obtains the maximum value during a time period $$\frac{f_1}{(f_1 - f_2) \cdot f_{01}}$$

as I'.

$f_{01}$ represents the first carrier wave frequency. Similarly, it monitors the output signal of the third low-pass filter 127 and obtains the maximum value during the same time period as Q'. A phase θ of the modulated received signal can be obtained by the following equation.

$$\theta = \tan^{-1}(Q'/I')$$

By taking signs of I' and Q' into consideration, a phase in the range between −π and π can be obtained.

The section C includes a section for generating modulated signal for transmission of the second frequency, a section for obtaining modulated received signal of the second frequency and a section for detecting a phase of the modulated received signal of the second frequency. In the present embodiment, the second frequency is 2 GHz.

The section for generating modulated signal of the second frequency for transmission includes a second carrier wave generator 143 for generating carrier wave of the second frequency (2 GHz), a distributor 144 for distributing the output of the second carrier wave generator 143, a second modulator 145 for modulating the carrier wave of the second frequency by the first pseudo random signal and a second transmitter 147 for transmitting the modulated carrier wave of the second frequency to the target as modulated signal for transmission of the second frequency. The second transmitter 147 is provided with a second transmitting antenna T2.

The section for obtaining modulated received signal of the second frequency includes a second receiver 149 for receiving the modulated signal of the second frequency which has been reflected by the target as a received signal of the second frequency, a fifth multiplier 151 for multiplying the received signal of the second frequency by the second pseudo random signal to obtain a modulated received signal of the second frequency and a distributor 156 for distributing the output of the fifth multiplier 151. The second receiver 149 is provided with a second receiving antenna R2

The section for detecting a phase of the modulated received signal of the second frequency includes a second hybrid coupler 153 for receiving a part of the carrier wave of the second frequency and delivering a second I signal and a second Q signal which are two components phases of which are orthogonal to each other, a sixth multiplier 155 for multiplying the output signal of the fifth multiplier 151 by the second I signal, a seventh multiplier 157 for multiplying the output signal of the fifth multiplier 151 by the second Q signal, a fourth low-pass filter 159 for low-pass filtering of the output signal of the sixth multiplier 155, a fifth low-pass filter 161 for low-pass filtering of the output signal of the seventh multiplier 157 and a second phase detector 163.

The second phase detector 163 monitors the output signal of the fourth low-pass filter 159 and obtains the maximum value during a time period $$\frac{f_1}{(f_1 - f_2) \cdot f_{o2}}$$

as I'.

$f_{o2}$ represents the second carrier wave frequency. Similarly, it monitors the output signal of the fifth low-pass filter 161 and obtains the maximum value during the same time period as Q'. A phase θ of the modulated received signal can be obtained by the following equation.

$$\theta = \tan^{-1}(Q'/I')$$

By taking signs of I' and Q' into consideration, a phase in the range between −Π and Π can be obtained.

The section D which obtains a measurement value of distance by combining outputs of the section A, the section B and the section C is a distance computing unit 165.

A distance measuring method according to an embodiment of the present invention will be described below. As described above, distance measurement can be carried out for each period $T_B$ of the reference signal. In the example described above, $T_B$=15.875 ms (millisecond).

Figure 4:
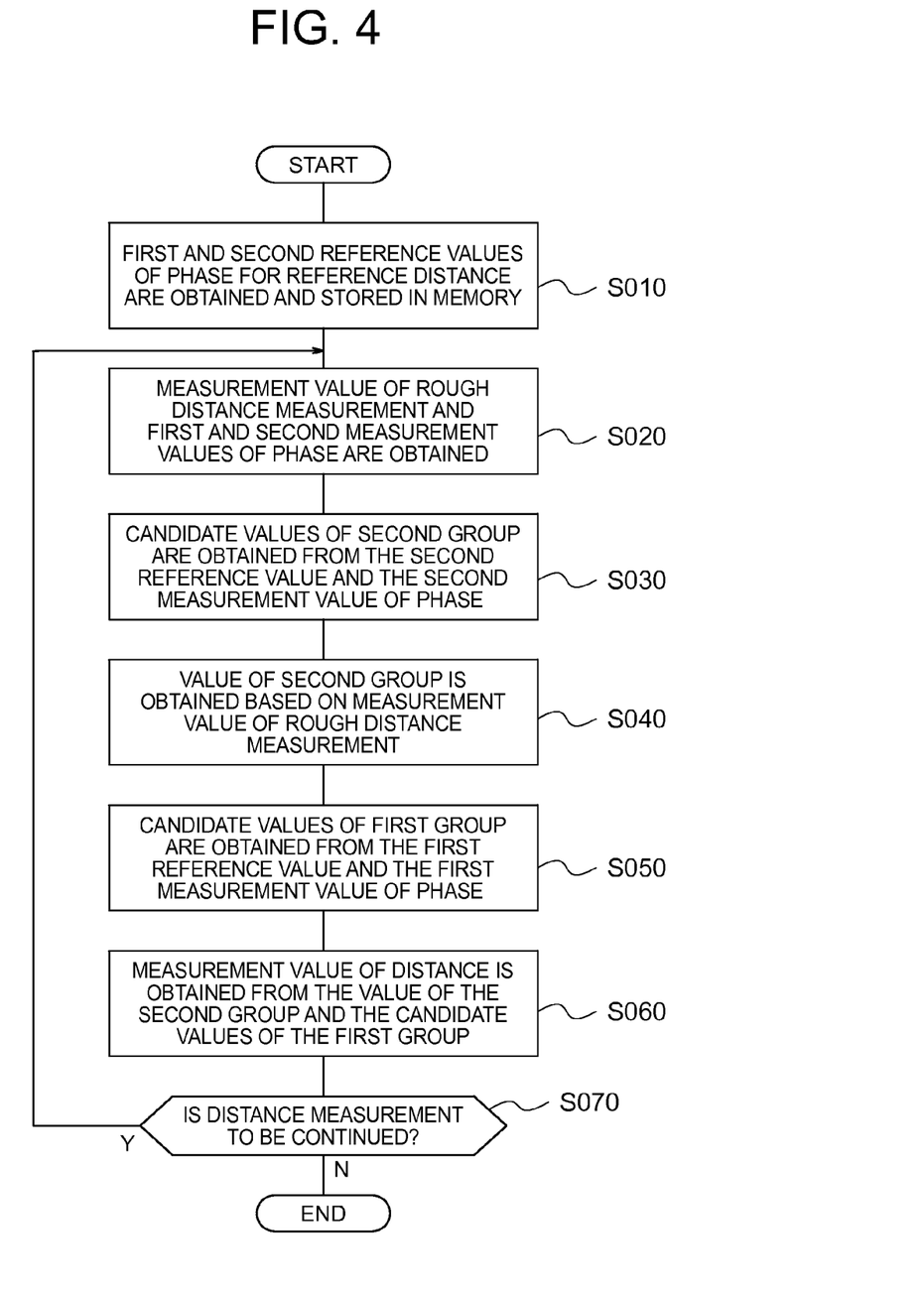
FIG. 4 is a flowchart for illustrating a distance measuring method according to an embodiment of the present invention.

FIG. 4 is a flowchart for illustrating a distance measuring method according to the embodiment of the present invention.

Table 1 shows an example of numerical data for illustrating the distance measuring method according to the present embodiment. In Table 1, measured IQ value corresponds to a measurement value of rough distance measurement obtained from time difference $T_D$ obtained by the section A. The measured IQ value varies around the actual value of distance due to measurement errors cased by various factors. Theoretical angle is a theoretical value of phase corresponding to a difference between the actual value of distance and reference distance which will be described later. Measured angle corresponds to a value of phase detected using the first or second frequency.

In the present embodiment, the first frequency is 10 GHz, the first wavelength corresponding to the first frequency is 30 mm, the second frequency is 2 GHz and the second wavelength corresponding to the second frequency is 150 mm.

TABLE 1

| Actual value of distance | 10 GHz | | | 2 GHz | | | | | 10 GHz | | |
| --- | --- | --- | --- | --- | --- | --- | --- | --- | --- | --- | --- |
| | Measured IQ value | Theoretical angle | Measured angle | Theoretical angle | Measured angle | Candidate 1 | Candidate 2 | Candidate 3 | Candidate 1 | Candidate 2 | Candidate 3 |
| 125 | 150 | 160 | 165 | 40 | 48 | | 126.67 | | | 125.21 | |
| 130 | 150 | 280 | 282 | 64 | 68 | | 130.83 | | | 130.08 | |
| 135 | 120 | 40 | 38 | 88 | 90 | | 135.42 | | | 134.92 | |
| 140 | 138 | 160 | 135 | 112 | 108 | | 139.17 | | | 138.96 | |
| 145 | 150 | 280 | 279 | 136 | 135 | | 144.79 | | | 144.96 | |
| 150 (Ref. distance) | 150 | 40 | 40 | 160 | 160 | | 150.00 | | | 150.00 | |
| 155 | 140 | 160 | 165 | 184 | 188 | | 155.83 | | | 155.21 | |
| 160 | 155 | 280 | 290 | 208 | 198 | | 157.92 | | | 160.42 | |
| 165 | 140 | 40 | 35 | 232 | 240 | 91.67 | 166.67 | 241.67 | 149.79 | 164.79 | 179.79 |
| 170 | 168 | 160 | 145 | 256 | 250 | | 168.75 | | | 169.38 | |
| 175 | 145 | 280 | 268 | 280 | 276 | | 174.17 | | | 174.50 | |
| 180 | 210 | 40 | 20 | 304 | 298 | | 178.75 | | | 179.17 | |
| 185 | 180 | 160 | 170 | 328 | 326 | | 184.58 | | | 185.42 | |

Each step in FIG. 4 is carried out by the section D (the distance computing unit 165 in FIG. 3).

In step S010 in FIG. 4, distance measurement for an object set at a reference distance is carried out and first and second measurement values of phase using the modulated received signals of the first and second frequencies are obtained. The first and second measurement values corresponding to the reference distance are stored in a memory not shown in FIG. 3 as first and second reference values of phase.

In Table 1, the reference distance is 150 mm. The first measurement value of phase for the reference distance is 40 degrees while the second measurement value of phase for the reference distance is 160 degrees.

In step S020 in FIG. 4, distance measurement of the object is carried out. That is, a measurement value of rough distance measurement and first and second measurement values of phase are obtained.

In Table 1, for the actual value of distance of 165 mm, a measurement value of rough measurement of 140 mm, a first measurement value of phase of 35 degrees and a second measurement value of phase of 240 degrees are obtained.

In step S030 in FIG. 4, a second group of candidate values of precise distance measurement is obtained from the second reference value of phase and the second measurement value of phase.

The second wavelength is 150 mm. Accordingly, by changing unit of angle in Equation (5) from radian to degree, the following equation is obtained.

$$\Delta x = \frac{75}{360}\theta' \pm 75n \quad (6)$$

$\Delta x$ represents difference between a candidate value of precise distance measurement and the reference distance.

In Table 1, the second reference value of phase is 160 degrees and the second measurement value of phase is 240 degrees. Accordingly, a phase difference is 80 degrees. By substituting this value into $\theta'$ in Equation (6), the following equation is obtained.

$$\Delta x = 16.67 \pm 75n$$

Since the reference distance is 150 mm, a second group of candidate values of precise distance measurement includes the following values.

91.67 mm, 166.67 mm, 241.67 mm

In step S040 in FIG. 4, in the second group of candidate values of precise distance measurement the value which is the closest to the measurement value of rough distance measurement is selected as a value of the second group.

The measurement value of rough distance measurement is 140 mm. Accordingly, the value of the second group is 166.67 mm.

In step S050 in FIG. 4, a first group of candidate values of precise distance measurement is obtained from the first reference value of phase and the first measurement value of phase.

The first wavelength is 30 mm. Accordingly, by changing unit of angle in Equation (5) from radian to degree, the following equation is obtained.

$$\Delta x = \frac{15}{360}\theta' \pm 15n \quad (7)$$

In Table 1, the first reference value of phase is 40 degrees and the first measurement value of phase is 35 degrees. Accordingly, a phase difference is -5 degrees. By substituting this value into $\theta'$ in Equation (7), the following equation is obtained.

$$\Delta x = -0.21 \pm 15n$$

Since the reference distance is 150 mm, a second group of candidate values of precise distance measurement includes the following values.

147.79 mm, 164.79 mm, 179.79 mm

In step S060 in FIG. 4, in the first group of candidate values of precise distance measurement the value which is the closest to the value of the second group is selected as a distance measurement value.

The value of the second group is 166.67 mm. Accordingly, the distance measurement value is 164.79 mm.

When the signal of the second frequency is used, a value of measured distance for one degree of phase is 0.21 mm from Equation (6). On the other hand, when the signal of the first frequency is used, a value of measured distance for one degree of phase is 0.04 mm from Equation (7). Thus, accuracy in distance measurement in the case that the first frequency is used is five times as much as that in the case that the second frequency is used.

When the signal of the second frequency is used, an interval between candidate values of precise distance measurement in the second group is 75 mm (a half of the second wavelength). On the other hand, when the signal of the first frequency is used, an interval between candidate values of precise distance measurement in the first group is 15 mm (a half of the first wavelength).

From Equations (5) and (6), one fourth of the second wavelength corresponds to a half of the interval between candidate values of precise distance measurement in the second group. Accordingly, in general, when precise distance measurement based on phase is carried out using signals of plural frequencies, arrangements should be made such that one fourth of the longest wavelength corresponding to the lowest frequency (in the present example, one fourth of the second wavelength, that is, 37.5 mm) is larger than accuracy of rough distance measurement. When such arrangements have been made, the value of the second group can be selected from candidate values of precise distance measurement in the second group in step S040 in FIG. 4. It should be noted that the longest wavelength corresponding to the lowest frequency is restricted by accuracy of rough distance measurement.

Further, from Equations (5) and (7), one fourth of the first wavelength corresponds to a half of the interval between candidate values of precise distance measurement in the first group. Accordingly, in general, when precise distance measurement based on phase is carried out using signals of plural frequencies, arrangements should be made such that one fourth of the higher frequency (the first frequency of 10 GHz) between two adjacent frequencies (in the present example, one fourth of the first wavelength, that is, 7.5 mm) is larger than accuracy of distance measurement in the case that the lower frequency (the second frequency of 2 GHz) between the two adjacent frequencies is used. When such arrangements have been made, the value of distance measurement can be selected, based on the value of the second group, from candidate values of precise distance measurement in the first group in step S060 in FIG. 4. It should be noted that accuracy of precise distance measurement can be determined without restriction caused by accuracy of the rough distance measurement.

In the above, a method in which two frequencies are used has been described. In general, distance measurement can be carried out using three or more frequencies while relationships between two adjacent frequencies are satisfied. Theoretically, accuracy of precise distance measurement can be improved without restriction by gradually increasing the number of used frequencies of electromagnetic wave while the relationships between two adjacent frequencies are satisfied.

Figure 5:
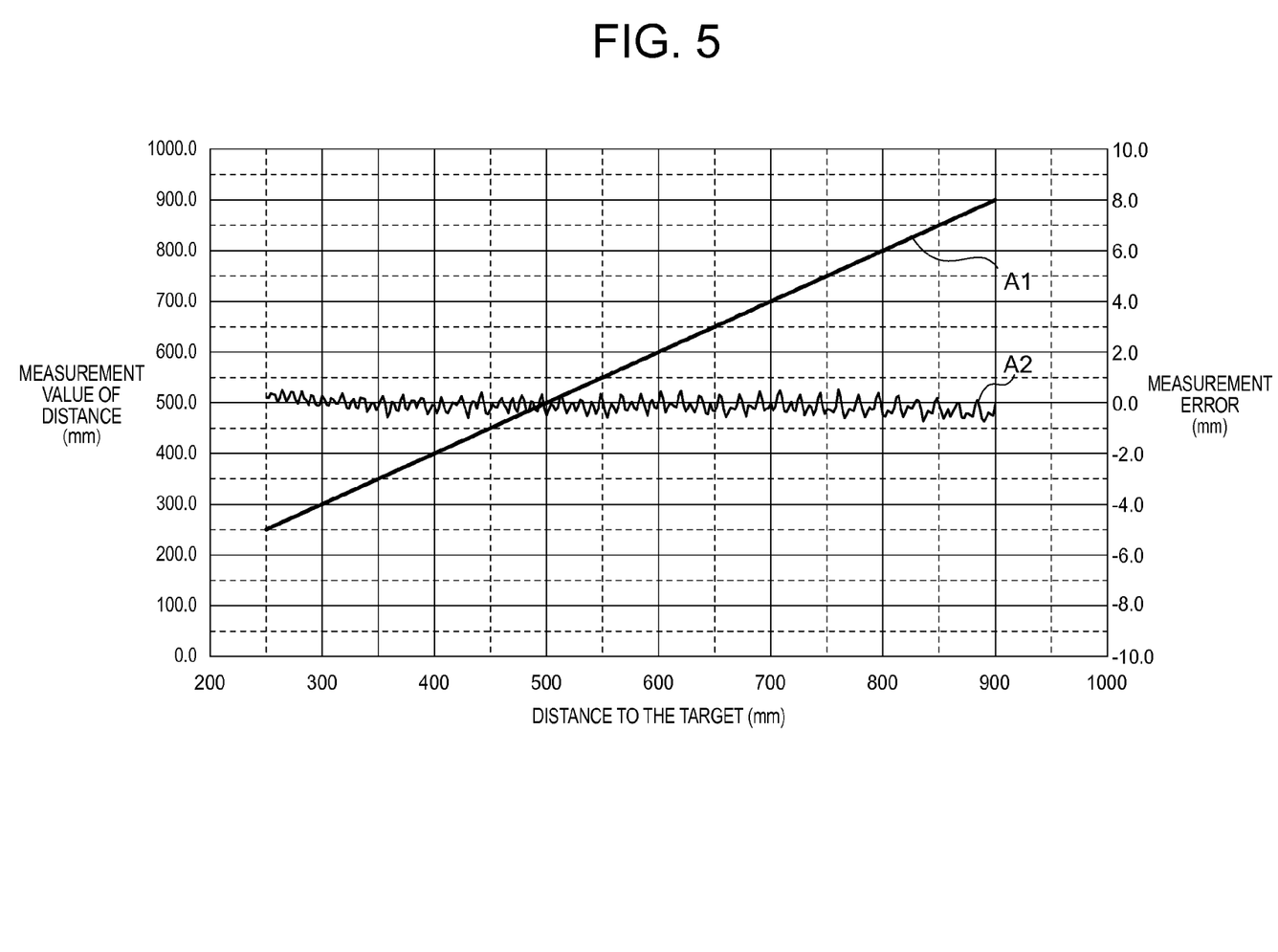
FIG. 5 shows results of measurement of the distance measurement method according to an embodiment of the present invention.

FIG. 5 shows results of measurement of the distance measurement method according to an embodiment of the present invention. The horizontal axis of FIG. 5 indicates distance to the target. The vertical axis of FIG. 5 indicates measurement value of distance (scale on the left side) and measurement error of distance (scale on the right side). A1 in FIG. 5 represents measurement value of distance while A2 in FIG. 5 represents measurement error of distance. As shown in FIG. 5, the measurement error varies periodically with distance. The period is a half of the wavelength (30 mm) of the first frequency (10 GHz). Magnitude of amplitude of the measurement error corresponds to error of phase calculation using the first frequency.

According to the present invention an absolute value of distance can be obtained with a high accuracy by carrying out distance measurement based on phase using plural frequencies in addition to distance measurement based on time. Further, a high accuracy in measurement can be realize without restriction caused by accuracy of the measurement based on time (rough distance measurement) using a combination of plural frequencies according to the method described avobe.

The invention claimed is:

1. A distance measuring apparatus comprising:
   a first pseudo random signal generator for generating a first pseudo random signal of clock frequency of $f_1$;
   a second pseudo random signal generator for generating a second pseudo random signal which has the same pattern as that of the first pseudo random signal and clock frequency of $f_2$ slightly lower than $f_1$;
   a first multiplier for multiplying the first pseudo random signal by the second pseudo random signal;
   a first carrier wave generator for generating a carrier wave of a first frequency;
   a first modulator for modulating the carrier wave of the first frequency by the first pseudo random signal;
   a first transmitter for transmitting the modulated carrier wave of the first frequency to a target as a modulated signal for transmission of the first frequency;
   a first receiver for receiving the modulated signal for transmission of the first frequency reflected by the target as a received signal of the first frequency;
   a second multiplier for multiplying the received signal of the first frequency by the second pseudo random signal to obtain a modulated received signal of the first frequency;
   a first hybrid coupler for receiving a part of the carrier wave of the first frequency and delivering a first I signal and a first Q signal which are two components phases of which are orthogonal to each other;
   a third multiplier for multiplying an output signal of the second multiplier by the first I signal;
   a fourth multiplier for multiplying the output signal of the second multiplier by the first Q signal;
   a first low-pass filter for low-pass filtering of an output of the first multiplier;
   a second low-pass filter for low-pass filtering of an output of the third multiplier;
   a third low-pass filter for low-pass filtering of an output of the fourth multiplier;
   first and second units for obtaining a square of the output signal of the second low-pass filter and a square of the output signal of the third low-pass filter, respectively;
   an adder for adding outputs of the first and second units;
   a first pulse generator for generating a first pulse when a maximum amplitude value of an output signal of the first low-pass filter is detected;
   a second pulse generator for generating a second pulse when a maximum amplitude value of an output signal of the adder is detected;
   a time measuring section for measuring a time period between generation of the first pulse and generation of the second pulse;
   a first phase detector for detecting a phase of the modulated received signal of the first frequency based on outputs of the second and third low-pass filters;
   a second carrier wave generator for generating a second carrier wave of a second frequency which is lower than the first frequency;
   a second modulator for modulating the second carrier wave by the first pseudo random signal;
   a second transmitter for transmitting the modulated second carrier wave to the target as a modulated signal for transmission of the second frequency;
   a second receiver for receiving the modulated signal for transmission of the second frequency reflected by the target as a received signal of the second frequency;
   a fifth multiplier for multiplying the received signal of the second frequency by the second pseudo random signal to obtain a modulated received signal of the second frequency;
   a second hybrid coupler for receiving a part of the carrier wave of the second frequency and delivering a second I signal and a second Q signal which are two components phases of which are orthogonal to each other;
   a sixth multiplier for multiplying an output signal of the fifth multiplier by the second I signal;
   a seventh multiplier for multiplying the output signal of the fifth multiplier by the second Q signal;
   a fourth low-pass filter for low-pass filtering of an output of the sixth multiplier;
   a fifth low-pass filter for low-pass filtering of an output of the seventh multiplier;
   a second phase detector for detecting a phase of the modulated received signal of the second frequency based on outputs of the fourth and fifth low-pass filters; and
   a distance computing unit for computing a distance to the target based on outputs of the time measuring section, the first phase detector and the second phase detector.

2. A distance measuring method using the distance measuring apparatus of claim 1, the method comprising the steps of:
   obtaining, by the distance computing unit, a value of rough distance measurement to the target based on the time period between generation of the first pulse and generation of the second pulse, measured by the time measuring section;
   obtaining, by the first phase detector, a first measurement value of phase which is the phase of the modulated received signal of the first frequency;
   obtaining, by the second phase detector, a second measurement value of phase which is the phase of the modulated received signal of the second frequency;
   obtaining, by the distance computing unit, a second group of plural candidate values of precise distance based on a reference distance, a second measurement value of reference phase of the modulated signal of the second frequency for the reference distance, which is previously obtained, and the second measurement value of phase and selecting, by the distance computing unit, the candidate value of precise distance which is the closest to the value of rough distance measurement in the plural candidate values of the second group as a value of the second group; and
   obtaining, by the distance computing unit, a first group of plural candidate values of precise distance based on the reference distance, a first measurement value of reference phase of the modulated signal of the first frequency for the reference distance, which is previously obtained, and the first measurement value of phase and selecting, by the distance computing unit, the candidate value of precise distance which is the closest to the value of the second group in the plural candidate values of the first group as a measurement value of distance.

3. A distance measuring method according to claim 2, wherein a value of distance measurement is determined based on candidate values of precise distance of three or more groups including the first and second groups using three or more transmission signals of different frequencies including the modulated signal for transmission of the first and second frequencies.

4. A distance measuring method according to claim 2, wherein in signals of plural frequencies used for precise distance measurement based on phase, one fourth of the longest wavelength corresponding to the lowest frequency is so determined as to be greater than an accuracy of rough distance measurement and one fourth of a wavelength corresponding to the higher frequency in two adjacent frequencies is so determined as to be greater than an accuracy of precise distance measurement based on phase using the lower frequency in the two adjacent frequencies.

5. A distance measuring method using an apparatus which includes first and second transmitters, first and second receivers, a time measuring section, first and second phase detectors and a distance computing unit, the method comprising the steps of:
   transmitting, by the first transmitter, modulated electromagnetic wave of a first frequency to a target;
   transmitting, by the second transmitter, modulated electromagnetic wave of a second frequency to the target;
   receiving, by the first receiver, the modulated electromagnetic wave of the first frequency which has been reflected by the target;
   receiving, by the second receiver, the modulated electromagnetic wave of the second frequency which has been reflected by the target;
   obtaining, by the time measuring section, a time period of travel between the apparatus and the target of the modulated electromagnetic wave of the first frequency which has been received by the first receiver;
   obtaining, by the distance computing unit, a value of rough distance measurement to the target based on the time period;
   obtaining, by the first phase detector, a first measurement value of phase which is a phase of the modulated electromagnetic wave of the first frequency which has been received by the first receiver;
   obtaining, by the second phase detector, a second measurement value of phase which is a phase of the modulated electromagnetic wave of the second frequency which has been received by the second receiver;
   obtaining, by the distance computing unit, a second group of plural candidate values of precise distance based on a reference distance, a second measurement value of reference phase of the modulated signal of the second frequency for the reference distance, which is previously obtained, and the second measurement value of phase and selecting, by the distance computing unit, the candidate value of precise distance which is the closest to the value of rough distance measurement in the plural candidate values of the second group as a value of the second group; and
   obtaining, by the distance computing unit, a first group of plural candidate values of precise distance based on the reference distance, a first measurement value of reference phase of the modulated signal of the first frequency for the reference distance, which is previously obtained, and the first measurement value of phase and selecting, by the distance computing unit, the candidate value of precise distance which is the closest to the value of the second group in the plural candidate values of the first group as a measurement value of distance.

6. A distance measuring method according to claim 5, wherein a value of distance measurement is determined based on candidate values of precise distance of three or more groups including the first and second groups using three or more transmission signals of different frequencies including the modulated signal for transmission of the first and second frequencies.

7. A distance measuring method according to claim 5, wherein in signals of plural frequencies used for precise distance measurement based on phase, one fourth of the longest wavelength corresponding to the lowest frequency is so determined as to be greater than an accuracy of rough distance measurement and one fourth of a wavelength corresponding to the higher frequency in two adjacent frequencies is so determined as to be greater than an accuracy of precise distance measurement based on phase using the lower frequency in the two adjacent frequencies.

* * * * *